United States Patent [19]

Bachalo

[11] Patent Number: 4,573,228
[45] Date of Patent: Mar. 4, 1986

[54] LIFTING DEVICE FOR REMOVING HONEY COMB ASSEMBLIES FROM SUPERS

[76] Inventor: Larry E. Bachalo, R.R. #1, Box 71, Portage La Prairie, Manitoba, Calif.X, R1N 3A1

[21] Appl. No.: 672,687

[22] Filed: Nov. 19, 1984

[51] Int. Cl.$^4$ .............................................. A01K 59/00
[52] U.S. Cl. .................................................... 6/12 R
[58] Field of Search .............. 6/12 R, 12 M; 294/158, 294/159, 165

[56] References Cited

U.S. PATENT DOCUMENTS

| 1,184,491 | 5/1916 | Ross ....................................... 6/12 R |
| 1,553,734 | 9/1925 | Wilson ............................... 6/12 R X |
| 4,346,490 | 8/1982 | Katz et al. ......................... 6/12 R X |

FOREIGN PATENT DOCUMENTS 882491  11/1981  U.S.S.R. ............................... 6/12 R

*Primary Examiner*—Robert P. Swiatek
*Attorney, Agent, or Firm*—Stanley G. Ade

[57] ABSTRACT

A rectangular frame carries a plurality of hook elements which can be engaged under the top bar of a honey-filled comb and includes breaker arms to separate the comb from the super by lever action, when lifting force is applied to the device. This lever action forces the comb upwardly from the super thus breaking the bee-glued junction therebetween. A hoist is provided to lift the device when hooked to the comb and this also operates the linkage to operate the breaker arms.

20 Claims, 4 Drawing Figures

LIFTING DEVICE FOR REMOVING HONEY COMB ASSEMBLIES FROM SUPERS

BACKGROUND OF THE INVENTION

This invention relates to new and useful improvements in lifting devices for removal of honey-filled combs from supers.

When bees fill the combs with honey, they tend to glue the comb assemblies to the super thus making separation thereof extremely difficult when it is desired to removed the honey-filled combs from the super and breakage occasionally occurs during this operation thus requiring time consuming repairs of the honey comb assembly. They can of course be re-used under normal circumstances.

The prior art includes several Patents which attempt to assist the apiarist and in this regard reference may be made to U.S. Pat. No. 1,848,485 which includes a pair of spring loaded inturned hook elements which may be engaged under one member of the comb.

U.S. Pat. No. 1,184,491 shows a somewhat similar member except that the device includes two pair of hooks actuated by a trigger mechanism and U.S. Pat. No. 1,559,868 discloses a lifting handle with hooks extending downwardly therefrom which engage the upper member of the comb by a twisting action thus forcing the hooks into engagement with the upper comb member.

None of these are satisfactory because of none of them address the problem of breaking away the comb from the super, it being understood that most honey-filled combs are firmly glued into position by the time they are full thus making it extremely difficult to separate the comb from the super without damage or breaking occurring to either one or the other.

SUMMARY OF THE INVENTION

The present invention overcomes these disadvantages and one aspect of the invention is to provide a lifting device for lifting honey-filled combs from a super, said combs including top bars, said super including an upper perimetrical wall edge; comprising in combination a substantially rectangular frame assembly, said frame assembly including a pair of spaced and parallel side bars, a plurality of hook elements pivoted for partial rotation within said side bars and extending below said side bars, means mounted in said frame assembly and being operatively connected to said hook elements, for moving said hook elements selectively between a comb top bar engaging position and a comb top bar disengaging position, and means on the ends of said side bars to locate and align said lifting device upon said top bars.

Another advantage of the invention is the provision of breaker arms at each end of the frame which, when a lifting force is applied to the honey-filled comb in order to lift it from the super, causes the ends of the breaker arms to bear against the upper perimetrical edge of the super thus applying a separating force to the comb at each corner thereof.

A still further advantage of the invention is to provide a device which is easily engaged by one hand and which can be connected to a hoist assembly which in turn is also easily operated by one hand thus leaving the other hand free to guide the combs onto the uncapping machine or a stand.

A still further advantage of the invention is to provide a device of the character herewithin described which is simple in construction, economical to manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 4:
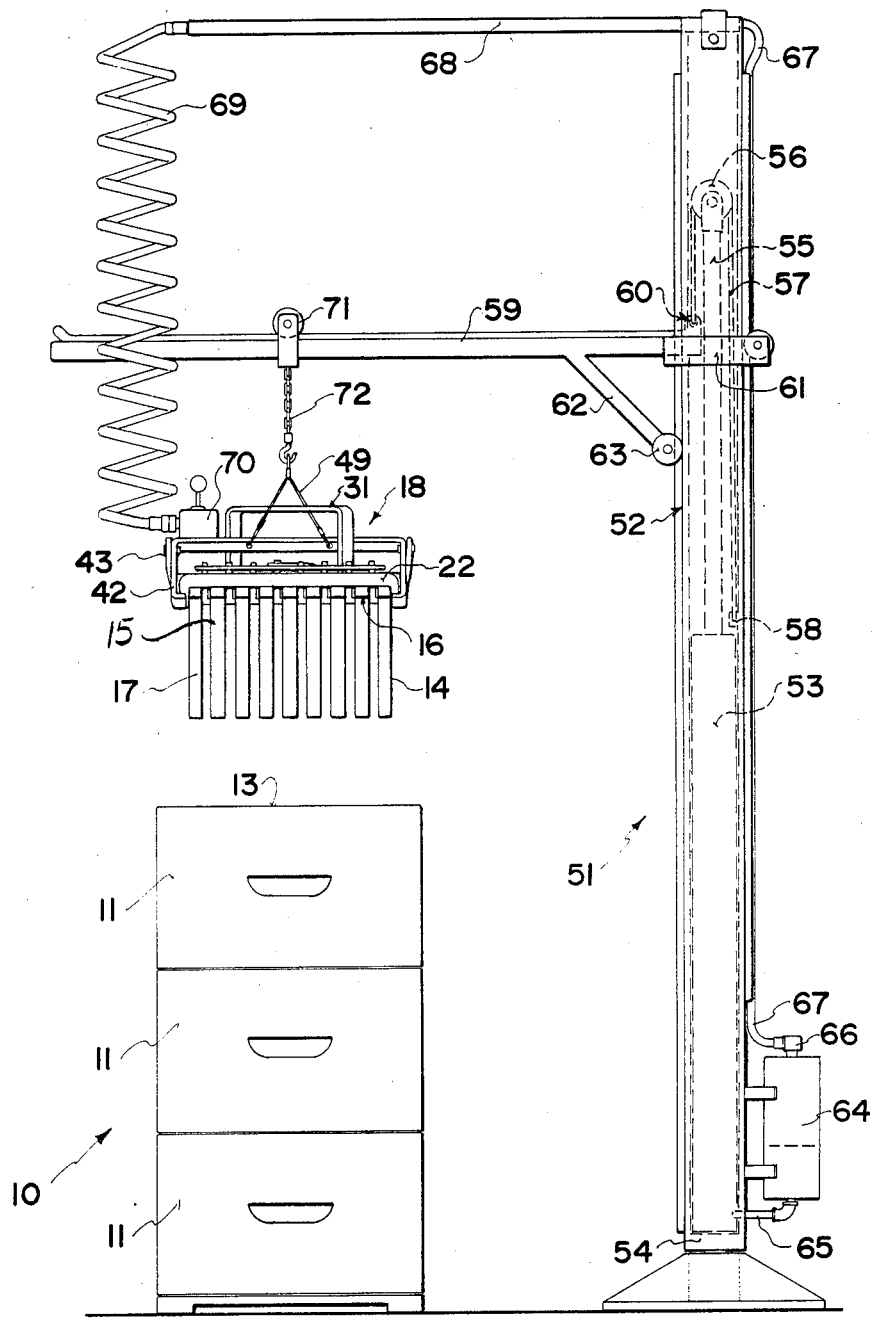
FIG. 4 is a view showing the winch lifting a comb from the super.

Proceeding therefore to describe the invention in detail, reference should first be made to FIG. 4 which shows a bee hive assembly collectively designated 10 consisting of supers 11 and into which honey comb assemblies collectively designated 12 are engaged.

The super is a box-like structure and includes an upper substantially rectangular perimetrical edge 13. The honey comb assembly is conventional in construction and includes the individual rectangular comb elements 14 suspended by the upper part of the comb frames 15 each of which includes vertical end bars 17 and a top bar 16 and which lie spaced and parallel to one another when installed within the super 11.

Figure 1:
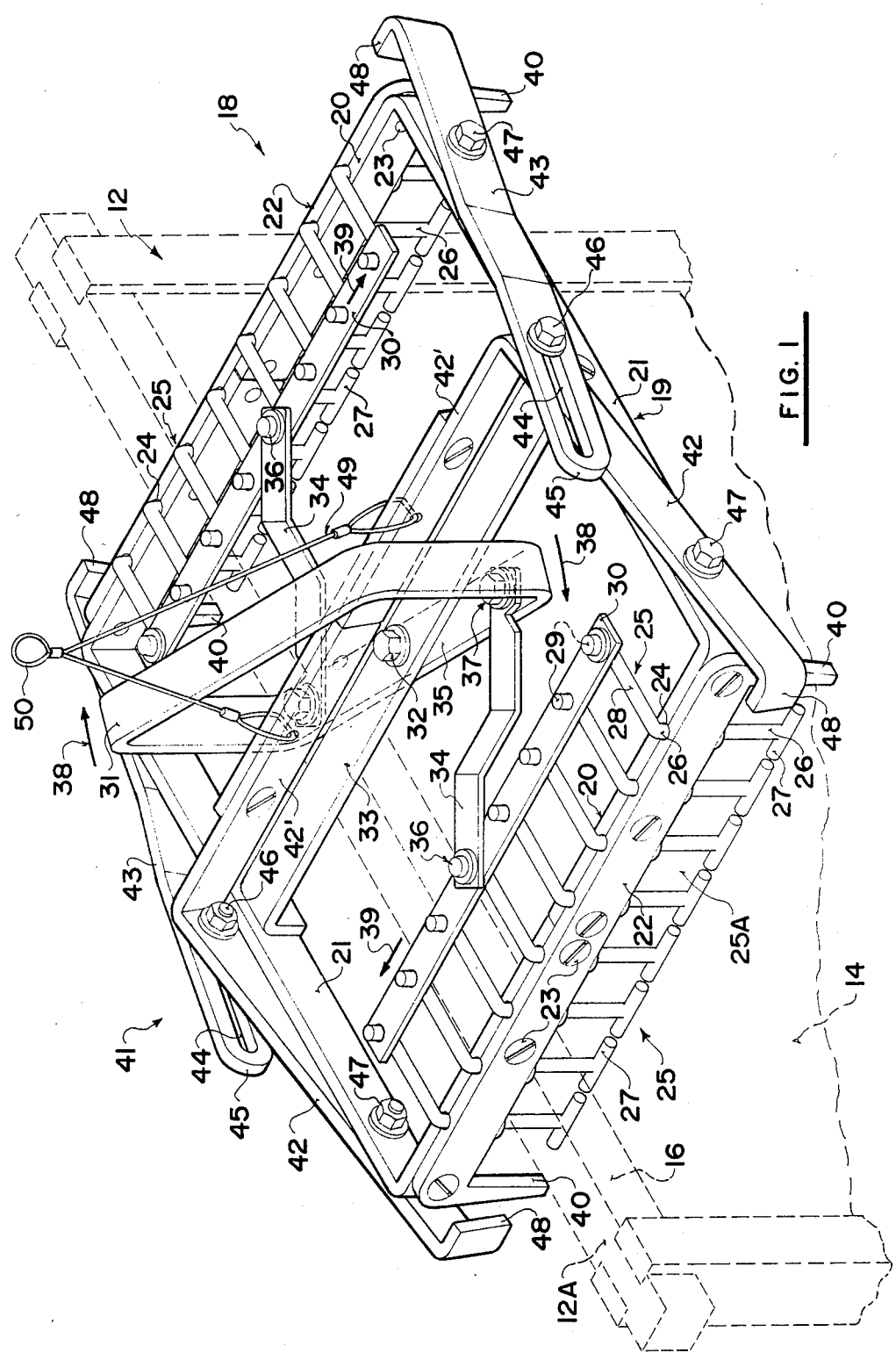
FIG. 1 is an upper isometric view of the device showing same in the engaged position.
Figure 2:
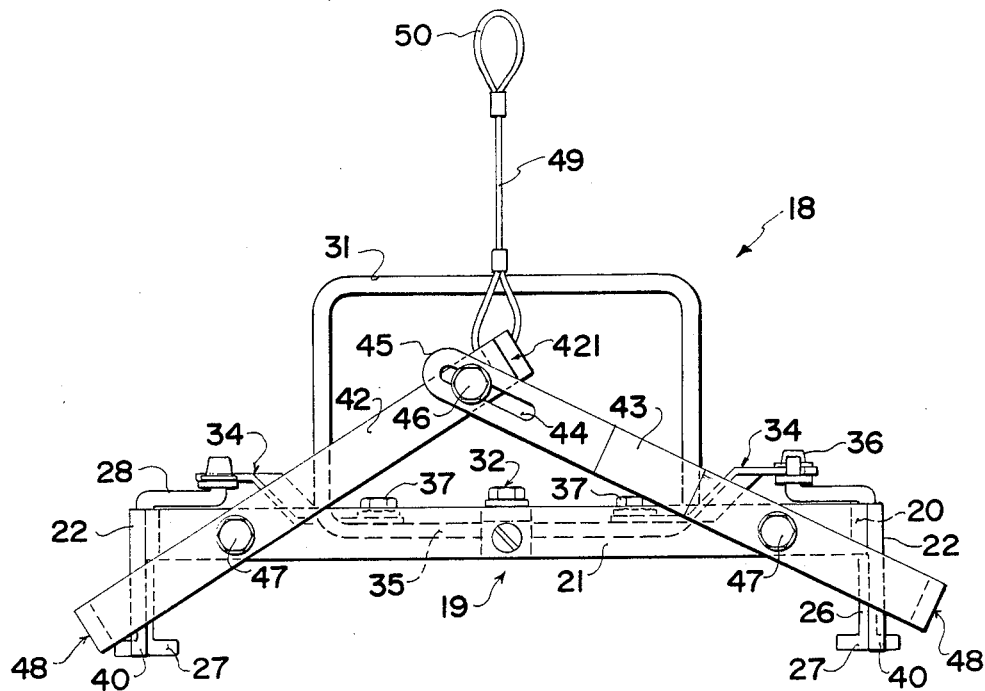
FIG. 2 is an end view but in the lift and disengaged position.
Figure 3:
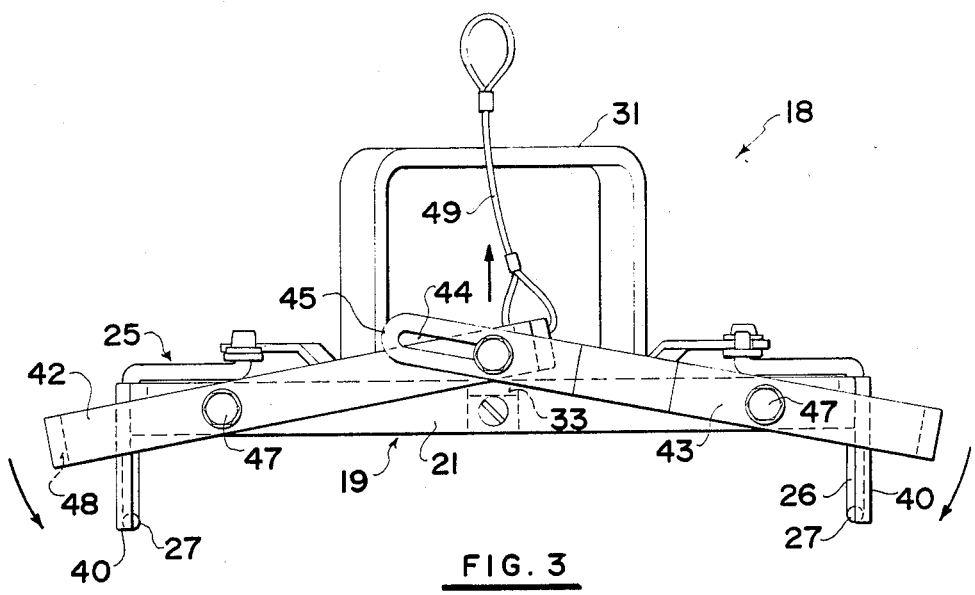
FIG. 3 is an end view of FIG. 1 showing the device in the engaged position.

Referring next to FIGS. 1, 2 and 3, the lifter device collectively designated 18 comprises a rectangular frame 19 made up of a pair of spaced and parallel side bars 20 and a pair of spaced and parallel end bars 21 joined together at the ends thereof to form the open rectangular frame illustrated.

In this embodiment, part of each of the side bars 20 includes a reinforcing bar 22 having downturned ends 40, (which act as limit stops for the outside combs) is secured by screws 23 along the length of the side bars 20 and vertical, cylindrical apertures 24 are formed through the junction of these two bars and along the lengths thereof as clearly illustrated.

Each of these apertures acts as a journal for a hook element collectively designated 25 and each of these hook elements includes a vertical portion 26 journalled through the cylindrical aperture within the bars 20 and 22. A T-bar 27 is formed or secured to the lower end of the vertical portion extending below the side bars and a horizontal portion 28 is formed on the upper ends of the vertical portions 26 above the edges of the side bars and extends inwardly towards the center of the open frame.

On the inner ends of the horizontal portions 28, an upturned end 29 is provided and these upturned ends are journalled in an aperture formed in a link plate 30. It will be noted that all of the horizontal or connector portions 28 are parallel with one another and engage the link plate 30 in spaced relationship there along. Means such as cotter pins (not illustrated) may be used to retain the link plate 30 in engagement with the ends 29 of the hook elements.

A substantially rectangular open framed actuating handle 31 is pivoted by means of pivot pin 32, to the center of a central bar 33 extending between the two end bars 21 of the frame 19, intermediate the ends thereof. Link members 34 extend between each link plate 30 and adjacent one end of the lower member 35 of the open framed handle 31, pivot pins 36 connecting the member 34 to the link plate and pivot pins 37 connecting the member 34 to the member 35 of the handle.

From the foregoing and with reference to FIG. 1, it will be appreciated that with the handle in the position shown in FIG. 1, all of the T-bars 27 lie substantially parallel to the side bars of the frame 19 and are thus in the engaged position with the top bars 16 of the comb frames 15.

If the handle is partially rotated in the direction of arrow 38, the link plates 30 will move in the direction of arrow 39 thus rotating the T-bars to a position substantially at right angles to the longitudinal axis of the side bars 20 so that they take up the position shown in FIG. 3.

The device, when in the position shown in FIG. 3, may then be placed upon the upper side of a comb assembly 12 so that the T-bars will slide down between adjacent upper comb bars 16.

Rotation of the handle will return the T-bars to the position shown in FIG. 1 with the upper side 16 of the individual combs 12A, being located within the spaces 25A and the cross member or T-bars 27 engaging under the adjacent upper sides or members 16 of all of the comb frames.

Upward movement of the device will of course elevate the comb assembly 12 including all nine of the combs simultaneously, clear of the super 11 and allow them to be moved to a location where the honey can be extracted therefrom.

However, as hereinbefore described, the comb assemblies 12 are glued firmly in position when installed on the hive, by means of propolis deposited by the bees. Considerable force is often required in order to separate the comb assembly from the super.

In this regard, means are provided to assist in the separation of the honey-filled combs from the upper perimetrical edge 13 of the super.

In this embodiment, breaker arm assemblies collectively designated 41 are provided adjacent each end bar 21 of the open frame 19. Reference to FIG. 1 will show that a pair of breaker arms is provided adjacent each end bar 21 and that the breaker bar 42 of each pair is formed integrally with a connector 42' thus forming a U-shaped component, it being understood that the connector extends from the inner end of one breaker bar or arm 42 to the other and is centrally located above the central arm 33 of the frame.

The other breaker arms 43 are provided with a closed-ended elongated slot 44 adjacent the inner ends 45 thereof and a pin 46 extending from adjacent the inner ends of the breaker arms 42 engages this slot one at each end thereof thus pivotally connecting the pairs of breaker arms together.

The breaker arms 42 and 43 are in turn pivotally connected by means of pivot pins 47, to the end bars 21 of the frame 19 and this pivot connection is inboard of the distal ends 48 of the breaker arms and inboard of the side bars 20 of the frame 19 as clearly shown in FIGS. 2 and 3. Furthermore the distal ends 48 of the breaker arms 42 and 43 are inturned to form ends which abut upon the upper surface of the perimetrical upper wall 13 of the super, when the device is installed prior to lifting the comb assembly 12 from the super.

A lifting element 49 in the form of a wire cable or the like is secured to the connector 42' intermediate the ends thereof and is provided with an upper loop 50 for connection to a winch assembly collectively designated 51 and illustrated in FIG. 4. The details of operation of the winch assembly will hereinafter be described.

From a perusal of FIGS. 2 and 3 it will be noted that FIG. 3 illustrates the position of the breaker arms 42 and 43 and the T-bars 27 when the device is installed upon the upper side of the comb assembly 12.

Actuation of the handle 31 as hereinbefore described, will rotate the T-bars to the position shown in FIG. 2 thus engaging the device upon the upper side of the comb assembly 12.

Upward movement or upward force applied to the cable connector 49 by means of winch 51, will lift the connector from its lower most position thus pivoting the breaker arms around pins 47 and forcing the inturned ends 48 downwardly upon the perimetrical upper edges 13 of the super thus applying force to separate the comb assembly 12 from the super. Further upward movement by winch 51 will cause the entire comb assembly 12 to be lifted clear of the super as clearly shown in FIG. 4.

Both the engagement of the device upon the comb assembly 12 and the actuation of the winch can be undertaken with one hand thus leaving the other hand free to guide the combs onto an extractor or a stand.

FIG. 4 shows details of the winch assembly which includes the outer standard or vertical standard 52 which preferably takes the form of square tubing with a pneumatic piston and cylinder 53 being situated therein and extending upwardly from the base 54. It is desirable that the cylinder dimensions be such that it just slides into the vertical standard 52 so that no further anchorage is required.

The piston rod 55 is provided with a pulley 56 on the upper end thereof and extends and retracts from the cylinder portion and a cable 57 extends over the pulley and one end is anchored adjacent the lower end of the vertical standard as indicated by reference character 58.

The other end is operatively connected adjacent the inner end of a horizontal arm 59 as indicated schematically by reference character 60 and this horizontal arm is journalled for movement up and down the vertical standard by means of a collar 61 surrounding the vertical standard and having small wheels or bearings (not illustrated) between the collar and the standard for ease of reciprocation. A brace arm 62 extends between a further wheel or bearing 63 and the underside of the horizontal arm 59. An oil accumulator 64 then communicates with the cylinder 53 via conduit 65, the oil entering the cylinder underneath the piston which reciprocates within the cylinder.

A source of compressed air (not illustrated) is connected to the upper side of the accumulator as indicated by reference character 66 and an air conduit 67 extends from this connection, upwardly of the vertical standard 52, along an upper horizontal support 68 to a flexible air hose 69 which in turn is connected to a control valve 70 situated adjacent the device and easily operated by the operator to raise or lower the horizontal arm 59 relative to the standard.

A sheave assembly 71 is slidable along the horizontal arm 59 and a chain or other form of flexible connection 72 extends between this sheave assembly and the aforementioned flexible cable portion 49 attached to the connector 43.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A lifting device for lifting a plurality of honey-filled combs from a super at the same time, each said combs including top bars, said super including an upper perimetrical wall edge; comprising in combination a substantially rectangular frame assembly capable of spanning the upper perimetrical wall of the super, said frame assembly including a pair of spaced and parallel transverse side bars, a plurality of double sided hook elements pivoted, in side by side relationship, for partial rotation within said side bars and extending below said side bars, means mounted in said frame assembly and being operatively connected to said hook elements, for moving each of said hook elements simultaneously and selectively between adjacent comb top bars and from between a comb top bar engaging position and a comb top bar disengaging position, and means on the ends of said side bars to locate and align said lifting device upon said top bars of the outermost combs.

2. The device according to claim 1 in which said means on the ends of said side bars to locate and align said lifting device include aligning pins adjacent the ends of each of said side bars and extending downwardly therefrom and engaging over said top bars of the outermost combs within said super, when said device is engaged upon said comb.

3. The device according to claim 2 in which each of said hook elements includes a vertical portion pivoted within said side bar, a T-bar on the lower end of said vertical portion below said side bar, a connecting portion extending at right angles from the other end of said vertical portion above said side bar, a link plate adjacent each side bar, each of said respective connecting portions of said hook elements being pivotally connected to the respective link plate along the length thereof, and an actuating handle journalled for partial rotation adjacent the center of said frame assembly, connected to each of said link plates, said T-bars lying substantially parallel to said side bars when in the disengaging position and substantially at right angles to said side bars when in the engaging position.

4. The device according to claim 3 in which said frame assembly includes a pair of spaced and parallel end bars connected to the respective ends of said side bars thereby defining a substantially rectangular frame, and a central bar extending between said end bars adjacent the center thereof, said actuating handle being journalled for partial rotation substantially centrally along said central bar.

5. The device according to claim 1 in which each of said hook elements includes a vertical portion pivoted within said side bar, a T-bar on the lower end of said vertical portion below said side bar, a connecting portion extending at right angles from the other end of said vertical portion above said side bar, a link plate adjacent each side bar, each of said respective connecting portions of said hook elements being pivotally connected to the respective link plate along the length thereof, and an actuating handle journalled for partial rotation adjacent the center of said frame assembly, connected to each of said link plates, said T-bars lying substantially parallel to said side bars when in the disengaging position and substantially at right angles to said side bars when in the engaging position.

6. The device according to claim 5 in which said frame assembly includes a pair of spaced and parallel end bars connected to the respective ends of said side bars thereby defining a substantially rectangular frame, and a central bar extending between said end bars adjacent the center thereof, said actuating handle being journalled for partial rotation substantially centrally along said central bar.

7. The device according to claim 6 which includes means mounted upon said frame assembly for lifting said device and separating said honey-filled comb from the upper perimetrical wall edge of said super.

8. The device according to claim 5 which includes means mounted upon said frame assembly for lifting said device and separating said honey-filled comb from the upper perimetrical wall edge of said super.

9. The device according to claim 5 in which said frame assembly comprises a rectangular frame including a pair of spaced and parallel end bars connected to said side bars at one end thereof, said means mounted upon said frame assembly for lifting said device including a breaker assembly pivotally mounted on each end bar and a connector extending therebetween.

10. The device according to claim 9 in which each of said breaker assemblies includes a pair of breaker arms, each said pair being pivotally connected to one end of said connector by the inner ends thereof, each arm of a respective pair being pivotally connected to adjacent the ends of said end bars at a position inboard of said breaker arms whereby an upper parametrical wall edge engaging portion extends beyond the said side bars of said frame assembly and is engagable upon the upper perimetrical wall of the super from which the comb is being lifted.

11. The device according to claim 10 which includes means to lift the device attached to the honey-filled comb, from said super, and means on said connector for detachably securing said device to said means to lift said device, upward movement of said connector by said means to lift said device, lifting the inner ends of said breaker arms thereby engaging said upper perimetrical wall edge engaging portion of each of said arms, with the parametrical wall edge of the super thus forcing the comb upwardly therefrom.

12. The device according to claim 9 in which each of said breaker assemblies includes a pair of breaker arms, each arm of a respective pair being pivotally connected to adjacent ends of said end bars at a position inboard of said breaker arms whereby an upper parametrical wall edge engaging portion extends beyond said side bars of said frame assembly and is engagable upon the upper parametrical wall of the super from which the comb is being lifted, one arm of each pair being formed integrally with said connector in a U-shaped configuration, the other arm of each pair having a closed ended elongated slot adjacent the inner end thereof and means pivoting said respective other arm to said one arm adjacent the junction thereof with said connector.

13. The device according to claim 12 which includes means to lift the device attached to the honeyfilled comb, from said super, and means on said connector for detachably securing said device to said means to lift said device, upward movement of said connector by said means to lift said device, lifting the inner ends of said breaker arms thereby engaging said upper parametrical wall edge engaging portion of each of said arms, with the perimetrical wall edge of the super thus forcing the comb upwardly therefrom.

14. The device according to claim 1 which includes means mounted upon said frame assembly for lifting said device and separating said honey-filled comb from the upper perimetrical wall edge of said super.

15. The device according to claim 14 in which said frame assembly comprises a rectangular frame including a pair of spaced and parallel end bars connected to said side bars at one end thereof, said means mounted upon said frame assembly for lifting said device including a breaker assembly pivotally mounted on each end bar and a connector extending therebetween.

16. The device according to claim 15 in which each of said breaker assemblies includes a pair of breaker arms, each said pair being pivotally connected to one end of said connector by the inner ends thereof, each arm of a respective pair being pivotally connected to adjacent the ends of said end bars at a position inboard of said breaker arms whereby an upper perimetrical wall edge engaging portion extends beyond the said side bars of said frame assembly and is engagable upon the upper parametrical wall of the super from which the comb is being lifted.

17. The device according to claim 15 in which each of said breaker assemblies includes a pair of breaker arms, each arm of a respective pair being pivotally connected to adjacent ends of said end bars at a position inboard of said breaker arms whereby an upper perimetrical wall edge engaging portion extends beyond said side bars of said frame assembly and is engagable upon the upper parametrical wall of the super from which the comb is being lifted, one arm of each pair being formed integrally with said connector in a U-shaped configuration, the other arm of each pair having a closed-ended elongated slot adjacent the inner end thereof and means pivoting said respective other arm to said one arm adjacent the junction thereof with said connector.

18. The device according to claim 17 which includes means to lift the device attached to the honeyfilled comb, from said super, and means on said connector for detachably securing said device to said means to lift said device, upward movement of said connector by said means to lift said device, lifting the inner ends of said breaker arms thereby engaging said upper perimetrical wall edge engaging portion of each of said arms, with the parametrical wall edge of the super thus forcing the comb upwardly therefrom.

19. The device according to claim 15 which includes means to lift the device attached to the honey-filled comb, from said super, and means on said connector for detachably securing said device to said means to lift said device, upward movement of said connector by said means to lift said device, lifting the inner ends of said breaker arms thereby engaging said upper parametrical wall edge engaging portion of each of said arms, with the perimetrical wall edge of the super thus forcing the comb upwardly therefrom.

20. The device according to claim 19 in which said means to lift said device comprises a power operated winch assembly including a main or vertical standard, a horizontal arm journalled by the inner end thereof upon said standard for movement up and down said standard, means on the outer end of said horizontal arm detachably engaging said connector and a source of power to move said horizontal arm up and down said standard.

* * * * *